D. C. SLAGHT & W. T. MILLER.
TRACTION WHEEL.
APPLICATION FILED JUNE 27, 1912.
1,145,088.
Patented July 6, 1915.
3 SHEETS—SHEET 3.
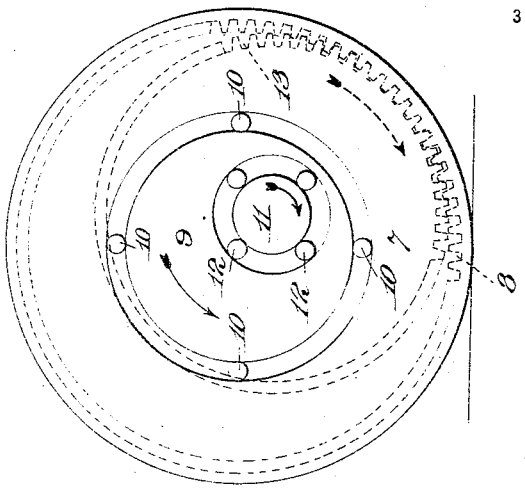
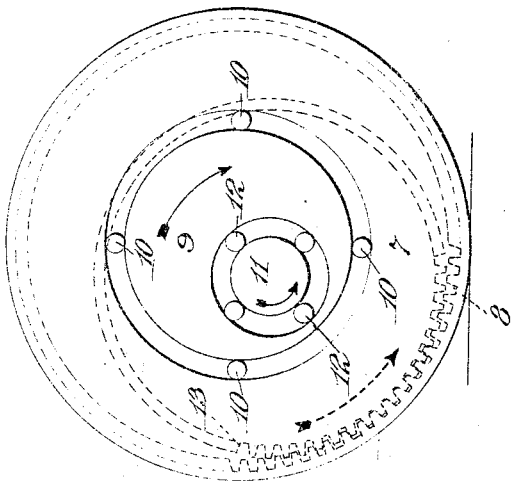
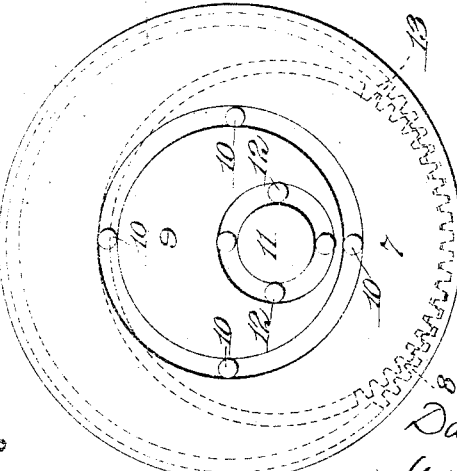

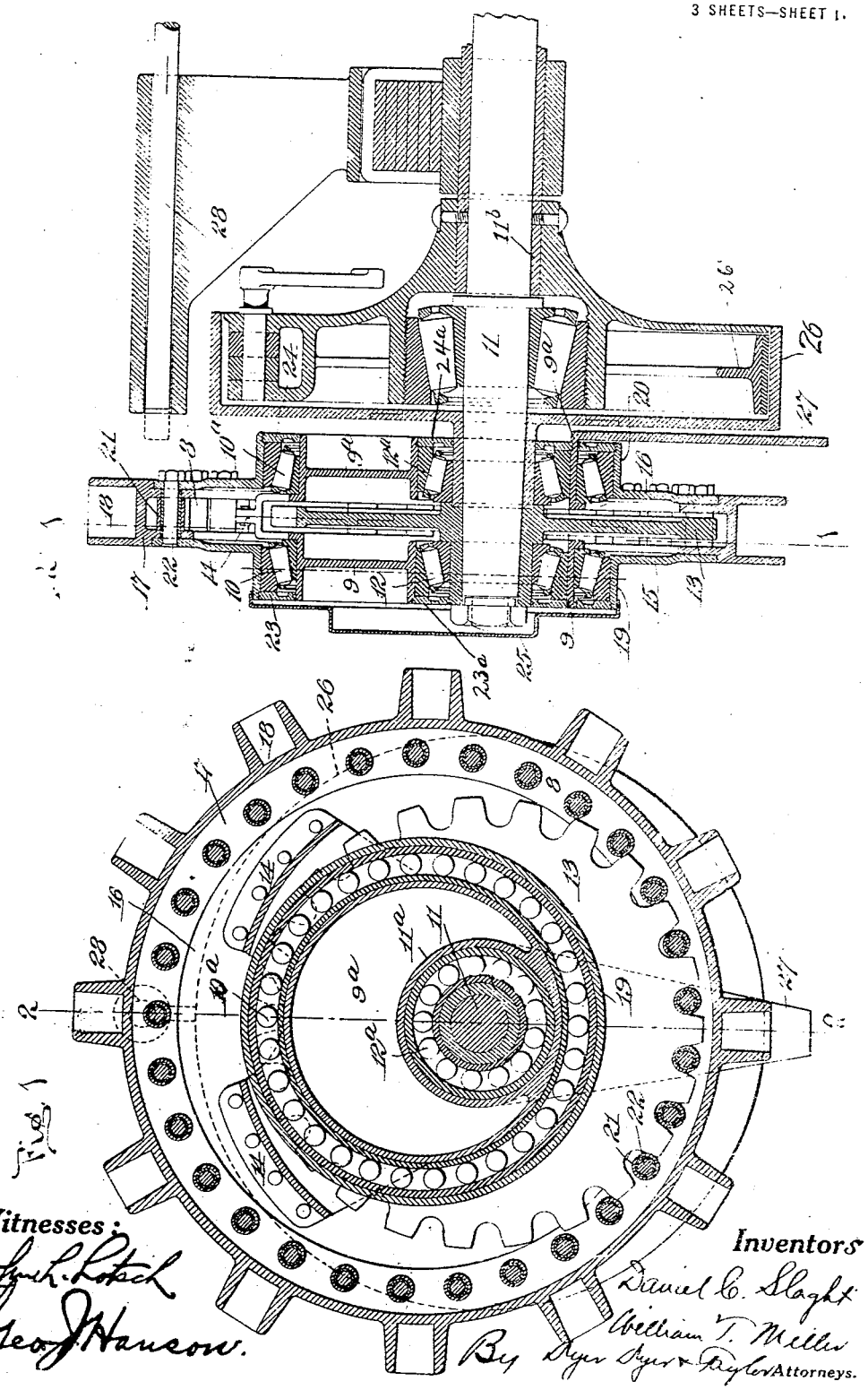

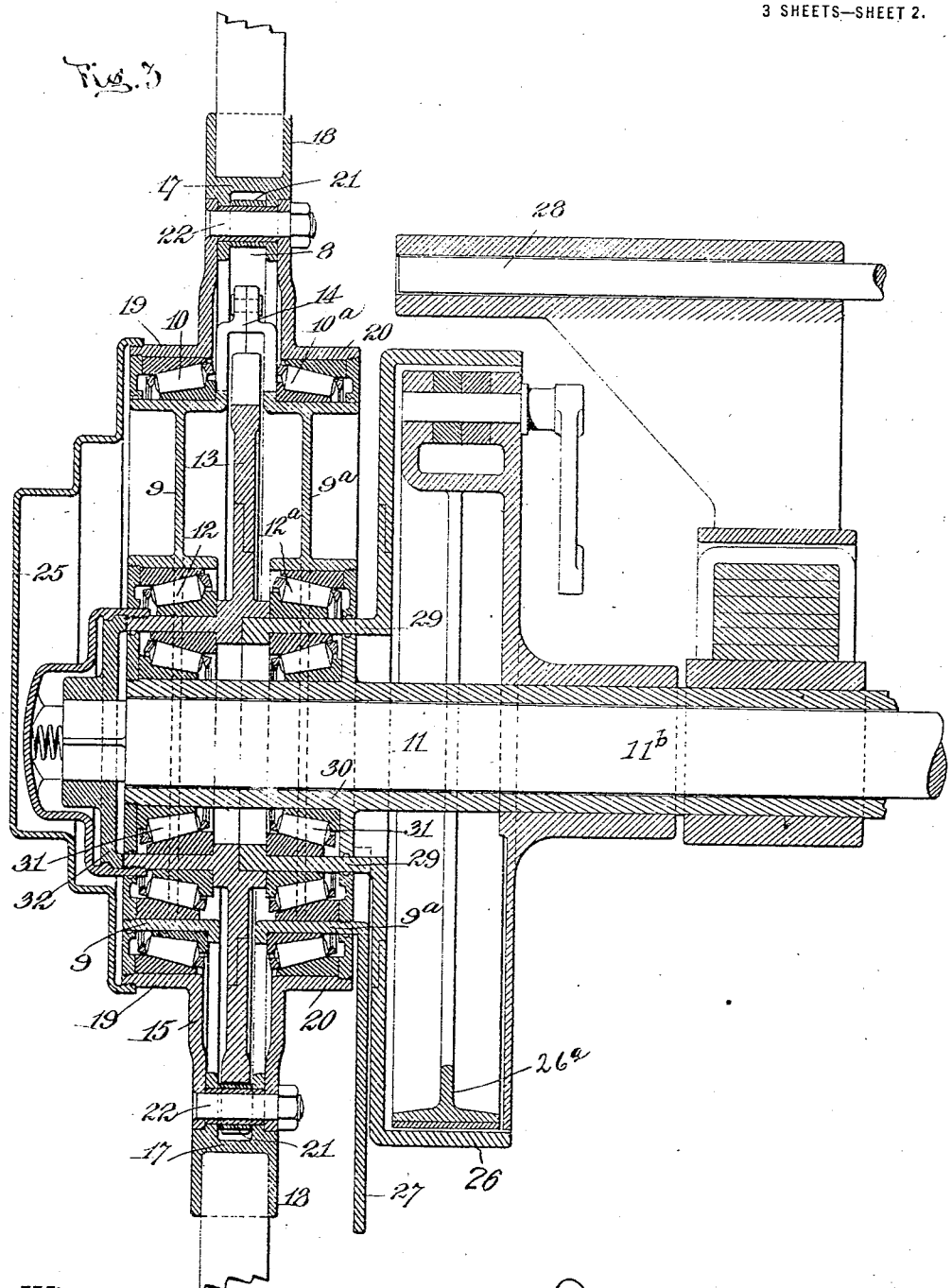

UNITED STATES PATENT OFFICE.

DANIEL C. SLAGHT AND WILLIAM T. MILLER, OF EASTON, PENNSYLVANIA; SAID SLAGHT ASSIGNOR TO RICHARD N. DYER, OF EAST ORANGE, NEW JERSEY, AND PHILIP S. DYER, OF EASTON, PENNSYLVANIA.

TRACTION-WHEEL.

1,145,088.  Specification of Letters Patent.  Patented July 6, 1915.

Application filed June 27, 1912. Serial No. 706,135.

*To all whom it may concern:*

Be it known that we, DANIEL C. SLAGHT and WILLIAM T. MILLER, citizens of the United States, residing at Easton, county of Northampton, and State of Pennsylvania, have invented a certain new and useful Improvement in Traction-Wheels, of which the following is a specification.

Our invention relates to traction wheels especially intended for use in automobiles, commercial vehicles and similar motor-driven vehicles, and its object is to provide a wheel having many advantages, some of which are hereinafter referred to.

Our traction wheel is one in which the driving axle floats eccentrically in the hub of the wheel forward or backward, according to whether the vehicle is being driven forward or backward or is being driven or checked, and the axle applies its power or braking effect to the wheel through gearing which primarily acts to lift the weight of the vehicle and overbalance the wheel in one or the other direction.

The invention consists in the elements and combinations hereinafter described and pointed out in the claims.

In the drawings, Figure 1 is a section of the hub of a wheel embodying our invention, taken in the plane of the wheel on the line 1—1 of Fig. 2. Fig. 2 is a section at right angles to Fig. 1, taken on the line 2—2 of Fig. 1. Fig. 3 is a view similar to Fig. 2, showing a modified form of the wheel; and Figs. 4, 5 and 6 are diagrams illustrating the action of the component parts of our wheel.

Referring first to Figs. 4, 5 and 6: 7 is a chambered hub, and 8 is an internal spur gear secured concentrically in the hub chamber. The hub may, for the purposes of the explanation of these figures, be regarded as resting on the ground. A carrier or eccentric 9, which is a cylindrical or disk-like body, is supported concentrically in an opening in the sides of the hub chamber by an antifriction bearing 10 represented in these figures by the four rollers or balls designated by that number. The driving axle shaft 11 passes through an eccentrically located opening in the carrier 9, and is surrounded by an antifriction bearing 12, the rollers or balls of which are located between the axle and the carrier. Fixed upon the axle shaft 11 is the spur gear wheel 13, which meshes with the internal gear 8. The weight of the vehicle supported by the axle shaft is carried by the eccentric 9 through the antifriction bearings 12 and 10 and not at all by the bearing of the gear 13 upon the gear 8, which gears are maintained in mesh on a true pitch line by the support afforded by the eccentric.

When the parts are at rest (Fig. 4), the weight supported by the axle shaft will turn the eccentric so that the axle will hang below the center of the hub and the gears 8 and 13 will mesh at the lowermost point. If the axle shaft is, however, driven in either direction, as shown in Figs. 5 and 6, the effect is to cause the gear 13 to roll upward on the internal gear 8 away from its central or rest position, and, in doing so, the axle will be raised, lifting the weight of the vehicle, the eccentric 9 turning sufficiently to permit this movement. The weight is, therefore, shifted in the direction of movement of the hub and, being raised, reacts upon the internal gear 8 to overbalance it in that direction, the action being similar to that of a man walking inside a hoop. A similar action takes place when the vehicle is checked by the brake, if the brake is applied to the axle shaft. In this case, the gear 13 is driven by the gear 8, and the gear 13 being restrained by the friction of the brake on the axle shaft tends to climb up on the backward side of the gear 8, thus utilizing the weight of the vehicle to check its movement. In either case, *i. e.*—whether the axle shaft is driven or is checked, the wheel is not acted on directly and positively, but indirectly by the reaction produced by the effort to lift the weight of the vehicle.

The utilization of this principle in a traction wheel for motor-driven vehicles secures numerous advantages, such as a reduction in the strain on the tires, preventing them from slipping on the ground, and hence increasing their life; also enabling the vehicle to be started and stopped more easily and more smoothly, absorbing shocks due to the engine and to the uneven surface of the road, and generally improving the riding qualities of the vehicle and increasing the life of all its parts. A further advantage arises from the fact that there is no danger of breaking any part from the sudden application of the power of the engine, since the eccentric 9 is free to turn completely around if under the conditions the weight of the vehicle is not sufficient to start the car. The principle can be applied to chain-driven as well as to shaft-driven vehicles whether of the "semi-floating" or "full floating" types, as will be later explained.

A construction illustrating the principle applied to a shaft-driven wheel of the "semi-floating" type is illustrated in Figs. 1 and 2, to which attention is now directed. Therein the eccentric is divided into two parts, 9 and 9ª, located on opposite sides of the gear wheel 13 whose hub forms the hub sleeve or box 11ª for the axle shaft 11. The axle shaft is carried in bearings mounted in the usual sleeve 11ᵇ, and the vehicle body is supported on the sleeve. The shaft 11, sleeve 11ᵇ and the differential casing (not shown) constitute the axle. The anti-friction bearings are likewise made in two parts, 10 and 10ª, and 12 and 12ª, respectively. The two parts of the eccentric are connected by saddles 14, which extend over the top of the gear 13 and hold the two parts of the eccentric in rigid relation with each other. The wheel hub is enlarged to form a chamber to carry the eccentric and associated parts. This chamber is inclosed by two side plates 15, 16, which are bolted together at their perimeters to the sides of a channel ring 17, carrying the spoke sockets 18. The side plates 15, 16, have shoulders 19, 20, which carry the outer races or cones of the anti-friction bearings 10, 10ª. The gear wheel 13 is shown in Figs. 1 and 2 in the form of a sprocket wheel, and the internal gear 8 is composed of sprocket rollers formed by sleeves 21 supported by bolts 22, which not only perform this function but also secure the side plates of the hub to the channeled spoke ring. We prefer this form of gearing for strength and durability, and also because the sprocket rollers can be more cheaply embodied in the construction than an ordinary internal spur gear. The sprocket rollers can also be readily renewed when worn, as likewise can the rim of the sprocket wheel 13, when that wheel is made in the divided form, as shown in the drawing. The open sides of the hub chamber are closed by the two parts of the eccentric, except for the spaces occupied by the anti-friction bearings. Those spaces are closed by rings 23, 24, 23ª, 24ª which are screwed respectively into the shoulders 19 and 20 of the hub chamber and into the divided eccentric at its shaft opening, such rings being packed with lead cord on their rubbing edges. The closure of the hub box is thus made complete, and the space thus inclosed may be filled with grease to lubricate the parts. A dust cap 25 may be placed over the outer end of the hub, to give a finished appearance to the wheel. Upon the axle shaft and rigidly secured to it and to the hub 11ª is mounted a brake drum 26, of any usual form. Carried on the sleeve 11ᵇ is a brake member 26ª adapted to be expanded into frictional engagement with the drum 26. This engagement will tend to retard the rotation of the axle shaft and the inertia of the car will cause the gear 8 to move forward or backward as depends on the direction of travel of the car before the brake was applied, and the gear 13 being held stationary by the brake will tend to climb up on the side of the gear 8 in the direction opposite to that of the movement of said gear and the weight of the car body will be added to the pressure applied to the brake to check the movement of the car.

The action of the parts will be understood from the explanation already given of Figs. 4, 5 and 6. In that explanation it is noted that the eccentric is free to turn completely around if the sudden application of power to the axle shaft were sufficient to lift the weight of the vehicle through the complete range of movement of the eccentric without starting the vehicle. We provide an emergency stop, which can be used to arrest this complete movement if the power required to start the vehicle when "mired" is greater than the weight of the vehicle. For this purpose, the inner part 9ª of the eccentric is provided with an arm 27 projecting radially outward therefrom, and a normally withdrawn stop 28 is supported by the chassis in line with the movement of the arm 27. When occasion requires, the stop 28 can be projected into the path of the arm 27, arresting the rotating movement of the eccentric in either direction and enabling the full power of the engine to be directly applied to the wheel.

In Fig. 3 the invention is shown as applied to the "full floating" type of wheel. The parts are the same as have already been described in connection with Figs. 1 and 2, except that the sprocket wheel 13, instead of being mounted directly upon the axle box, is mounted upon a sleeve 29 which, in turn, is mounted upon a stationary sleeve 30 surrounding the axle shaft 11. Anti-friction bearings 31 are placed between the sleeves 29 and 30 and the axle shaft is connected with the sleeve 29 so as to drive it by means of a clutch 32, secured to the end of the axle shaft where it projects through the sleeve 30, and engaging with the adjacent end of the sleeve 29. From the sleeve 29 outward the parts are the same as have already been described in connection with Figs. 1 and 3.

The "full floating" type of drive which constitutes the difference between the construction shown in Fig. 3 and that shown in Figs. 1 and 2 will be understood without further description. The brake drum 26 is connected with the sleeve 29, as will also be the chain drive if the wheel is a chain-driven instead of a shaft-driven wheel, in which latter case the clutch 32 would, of course, be omitted. It should be understood that the sleeve 29 of Fig. 3 is included as the element referred to by the expression "axle" in the claims hereinafter made.

What we claim is:—

1. In a motor driven vehicle, the combination with a wheel, a rotating axle member floating eccentrically in the hub of the wheel on anti-friction bearings, a pinion carried by the member and an internal gear carried by the hub meshing with said pinion, of a brake acting on said member, whereby the vehicle will be checked by the re-action produced by lifting its weight, substantially as set forth.

2. In a motor driven vehicle, the combination with a wheel, a rotating axle member floating eccentrically in the hub of the wheel on anti-friction bearings, a pinion carried by the member and an internal gear carried by the hub meshing with said pinion, of a brake acting on said member, whereby the vehicle will be checked by the re-action produced by lifting its weight, and means limiting the floating movement of the member when checked by the brake, substantially as set forth.

3. In a motor driven vehicle, the combination with the hub of a traction wheel, of the driving axle member floating eccentrically in the hub on anti-friction bearings, a gear carried by the member meshing with an internal gear carried by the hub, and a brake coacting with said member, whereby the vehicle will be driven and checked by the reaction produced by lifting its weight, substantially as set forth.

4. In a motor driven vehicle, the combination with the hub of a traction wheel, of the driving axle member floating eccentrically in the hub on anti-friction bearings, a gear carried by the member meshing with an internal gear carried by the hub, a brake coacting with said member, whereby the vehicle will be driven and checked by the reaction produced by lifting its weight, and means limiting the floating movement of the driving member in both directions, substantially as set forth.

5. In a motor driven vehicle, the combination with the hub of a traction wheel, of an eccentric mounted concentrically in the hub on anti-friction bearings, the power driven axle member passing eccentrically through such eccentric and supported therein by anti-friction bearings, a gear supported by said member, an internal gear carried by the hub and with which the axle gear meshes, and a brake coacting with the member, substantially as set forth.

6. In a motor driven vehicle, the combination with the hub of a traction wheel, of an eccentric mounted concentrically in the hub on anti-friction bearings, a power driven axle shaft passing eccentrically through such eccentric and supported therein by anti-friction bearings, a gear supported by said axle shaft, an internal gear carried by the hub and with which the axle gear meshes, and means limiting the angular movement of the eccentric in both directions, substantially as set forth.

7. In a motor driven vehicle, the combination with the hub of a traction wheel, of an eccentric mounted concentrically in the hub on anti-friction bearings, a power driven axle shaft passing eccentrically through such eccentric and supported therein by anti-friction bearings, a gear supported by said shaft, an internal gear carried by the hub and with which the axle gear meshes, an arm projecting radially from the eccentric and a stop on the chassis in the path of the movement of the arm for limiting the angular movement of the eccentric in both directions, substantially as set forth.

8. In a traction wheel of the character described, the combination with a hub having side plates secured to a spoke ring, of sprocket roller bearings within the hub chamber, the journals of the rollers serving to secure the side plates to the spoke ring, substantially as set forth.

9. In a traction wheel of the character described, the combination with a chambered hub, of a divided eccentric closing the sides of the hub chamber except at the anti-friction bearings, and a ring closing each bearing space, substantially as set forth.

10. In a traction wheel of the character described, the combination with the eccentric, of a stop arm projecting therefrom and a removable stop in the line of movement of such stop arm, to limit the rotating movement of the eccentric, substantially as set forth.

11. In a traction wheel of the character described, the combination with the eccentric, of a stop arm projecting therefrom and a normally withdrawn stop in the line of movement of such stop arm, to limit the rotating movement of the eccentric, substantially as set forth.

This specification signed and witnessed this 24th day of June, 1912.

DANIEL C. SLAGHT.
WILLIAM T. MILLER.

Witnesses:
CLARENCE BECK,
CHAS. B. BUNNER.